United States Patent Office 3,803,164
Patented Apr. 9, 1974

3,803,164
SIMPLIFIED ONE VESSEL PREPARATION OF 1-(5-ALKYL-1,3,4-THIADIAZOL-2-YL) - 1,3-DIALKYL-UREAS WITH AZEOTROPIC DRYING
Eddie Vi Ping Tao, Indianapolis, Ind., assignor to Eli Lilly and Company, Indianapolis, Ind.
No Drawing. Filed May 22, 1972, Ser. No. 255,703
Int. Cl. C07d 91/62
U.S. Cl. 260—306.8 D          2 Claims

ABSTRACT OF THE DISCLOSURE 1-(5-alkyl-1,3,4-thiadiazol-2-yl)-1,3 - dialkyl ureas are prepared by the condensation of a 1-acyl-4-alkylthiosemicarbazide in an aromatic hydrocarbon-mineral acid solvent mixture to yield a 2-alkylamino-5-alkyl-1,3,4-thiadiazole followed by reaction with an alkylisocyanate in a dry aromatic hydrocarbon solvent.

Background of the invention 1-(5-alkyl-1,3,4-thiadiazol-2-yl)-1,3 - dialkyl ureas are useful as herbicides in accordance with the disclosure of co-pending application Ser. No. 37,836, filed May 15, 1970 (now abandoned). The compounds are conventionally prepared by acylating a 4-alkylthiosemicarbazide, cyclodehydrating the resulting product to form a 2-alkylamino-5-alkyl-1,3,4-thiadiazole and then reacting the thus formed thiadiazole with an alkyl isocyanate to form the desired compounds. The cyclodehydration step is customarily carried out in the presence of concentrated sulfuric acid [see for example M. Ohta and T. Higashijima, J. Pharm. Soc. Japan, 72, 376 (1952) or E. Hoggarth, J. Chem. Soc., 1163 (1949)]. Other well-documented methods of cyclodehydration involve the use, for example, of polyphosphoic acid, phosphorus pentachloride, or acid chlorides as catalytic agents. The reaction of 2-alkylamino-5-alkyl-1,3,4-thiadiazole with alkyl isocyanate is carried out according to conventional procedures.

Summary of the invention

This invention provides a process for preparing 1-(5-alkylthiadiazolyl)-1,3-dialkylureas which comprises reacting a 1-acyl - 4 - alkylthiosemicarbazide (I) in a solvent mixture comprising a concentrated mineral acid and an aromatic hydrocarbon solvent to form a 2-alkylamino-5-alkyl-1,3,4-thiadiazole (II), separating and discarding the sulfuric acid layer, azeotropically drying the aromatic solvent layer containing the thiadiazole and then adding an isocyanate of the formula R″—N=C=O to react with the thiadiazole to form a 1-(5-alkylthiadiazol-2-yl)-1,3-dialkylurea (III), according to the following equation:

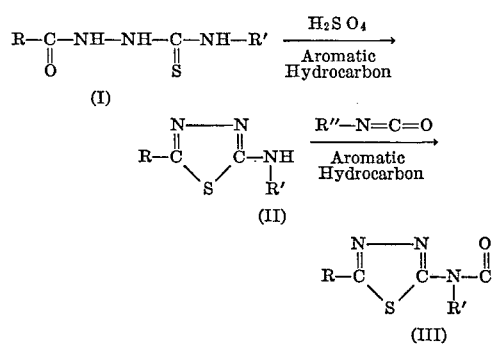

wherein R is $C_1$–$C_6$ alkyl or halo-$C_1$–$C_4$ alkyl, R′ is $C_1$–$C_6$ alkyl or hydrogen and R″ is hydrogen or $C_1$–$C_4$ alkyl, at least one of R′ and R″ being other than hydrogen.

By the term aromatic hydrocarbon is meant benzene and its alkylated derivatives including toluene and the various xylenes, o-xylene, m-xylene and p-xylene as well as other alkyl benzenes including ethylbenzene.

The term mineral acid includes, preferably, sulfuric acid and hydrochloric acid, although other mineral acids as phosphoric, pyrophosphoric and the like acids are also operative.

Illustrative of the $C_1$–$C_6$ alkyl groups which R and R′ can represent are the following: methyl, ethyl, n-propyl, isopropyl, t-butyl, n-butyl, isobutyl, sec-butyl, 1-pentyl, 2-pentyl, 3-pentyl, 3-methyl-1-butyl, 3-methyl-2-butyl, 2-methyl-2-butyl, neopentyl, 1-hexyl, 2-hexyl, 3-hexyl, 4-methyl-1-pentyl, 4-methyl-2-pentyl, 2-methyl-2-pentyl, 2-methyl-3-pentyl 2,3-dimethyl-1-butyl, 2,3 - dimethyl - 2-butyl, 3,3-dimethyl-1-butyl, 3,3-dimethyl-2-butyl, 2,2-dimethyl-1-butyl, 2-ethyl-1-butyl, 2-ethyl-2-butyl and the like. Illustrative groups for R″ when it represents $C_1$–$C_4$ alkyl are included in the above listing. Illustrative of the halo $C_1$–$C_3$ alkyl groups which R can represent are the following: trifluoromethyl, pentafluoroethyl, heptafluoro-n-propyl, fluoromethyl, 2-fluoroethyl, chloromethyl, difluoromethyl, chlorodifluoromethyl, bromomethyl, iodomethyl, bromodifluoromethyl and the like. Compounds preparable by the process of this invention include the following:

1-(5-sec-butyl-1,3,4-thiadiazol-2-yl)-1-ethyl-3-methylurea
1-(5-heptafluoroisopropyl-1,3,4-thiadiazol-2-yl)-1-(2-pentyl)-3-n-butylurea
1-(5-difluoromethyl-1,3,4-thiadiazol-2-yl)-1,3-di-n-propylurea
1-[5-(1′-hexyl)-1,3,4-thiadiazol-2-yl]-1-(isobutyl)-3-neopentylurea
1-[5-(2′-methyl-1′-butyl)-1,3,4-thiadiazol-2-yl]-1,3-di-n-butylurea As previously stated the compounds preparable by the processes of this invention are herbicidally active. They are soil active, broad spectrum herbicides. At high application rates the compounds are total herbicides, but show selectivity at lower application rates.

The 1-acyl-4-alkylthiosemicarbazide starting materials useful in the above process are prepared by acylating a 4-alkylthiosemicarbazide with an acyl halide in the presence of a acid-acceptor as taught in co-pending application Ser. No. 157,751, filed June 28, 1971 (now abandoned).

In carrying out the above reaction, the 1-acyl-4-alkyl-thiosemicarbazide is added to concentrated sulfuric acid at a temperature of about 50° C. The aromatic hydrocarbon, toluene for illustrative purposes only, is then added and heating continued for about another hour. At this point, the sulfuric acid is diluted with water and then neutralized with 28% ammonium hydroxide, the final pH being in the range 7.5–7.8. The sulfuric acid layer is then separated and washed in a second vessel with toluene and the toluene wash added to the original toluene solution containing the 2-alkylamino-5-alkyl - 1,3,4 - thiadiazole. This solution is dried azeotropically. The desired isocyanate is added thereto and the mixture heated for from 1 to 2 hours at a temperature of about 85–90° C. The desired urea is isolated from the reaction mixture by conventional means.

This invention is further illustrated by the following specific examples.

EXAMPLE 1

Preparation of 1-(5-trifluoromethyl-1,3,4-thiadiazol-2-yl)-1,3-dimethylurea

About 19.5 g. of 1-trifluoromethyl-4-methylthiosemicarbazide was added to about 18 g. of 18 M sulfuric acid at a temperature in the range 50–55° C. Heating was continued in the same temperature range for another hour at which point 50 ml. of water and 50 ml. of toluene were added; 35 ml. of 28% ammonium hydroxide were next added, thus raising the pH of the solution to about 7.5. The aqueous layer was separated and extracted with two 25 ml. portions of toluene. The toluene washes were added to the original toluene layer which was azeotropically dried. Ammonium sulfate formed in the above neutralization was separated by filtration. 6.8 g. of methylisocyanate was added in dropwise fashion to the toluene solution which was maintained at a temperature in the range 85–90° C. After the addition had been completed, the reaction mixture was heated at the same temperature for another 1.5 hours and was then cooled. 1-(5-trifluoromethyl - 1,3,4 - thiadiazol - 2 - yl)-1,3-dimethylurea formed in the above reaction was separated by filtration. The filter cake was washed with toluene and dried, yielding 1 - (5 - trifluoromethyl - 1,3,4 - thiadiazol-2-yl)-1,3-dimethylurea melting at about 133–135° C. Yield=14.9 g.

EXAMPLE 2

Preparation of 1-(5-t-butyl-1,3,4-thiadiazol-2-yl)-1,3-dimethylurea

About 30.6 g. of 18 M sulfuric acid was placed in a 250 ml. 3-neck round-bottom flask. 32.1 g. of 1-pivalyl-4-methylthiosemicarbazide was added to the sulfuric acid at a temperature in the range 50–55° C. About 20 ml. of toluene were added. Heating was continued at 55° C. for about 1 hour. 25 ml. of water were then added and the resulting mixture neutralized with 60 ml. of 28% ammonium hydroxide. The pH of the solution was in the range 7.5–7.8. The aqueous acidic layer was separated and extracted with two 30 ml. portions of toluene. The toluene extracts were combined with the original toluene layer which was dried azeotropically. The toluene solution was heated to a temperature in the range 85–90° C. and 9.7 g. of methylisocyanate was added. The reaction mixture was heated for an additional 1.5 hours at a temperature in the range 85–90° C. The reaction mixture was cooled and 1 - (5 - t-butyl-1,3,4-thiadiazol-2-yl)-1,3-dimethylurea formed in the above reaction precipitated. The precipitate was separated by filtration and dried to yield 32.2 g. of 1-(5-t-butyl-1,3,4-thiadiazol-2-yl)-1,3-dimethylurea melting at about 160–162° C. (84% yield). The material was 97.8% pure by quantitative thin layer chromatography.

A second run carried out as above yielded 34.4 g. of 1-(5 - t-butyl-1,3,4-thiadiazol-2-yl)-1,3-dimethylurea having a purity of 97.7% by quantitative thin layer chromatography; yield=88.5%.

EXAMPLE 3

Preparation of 1-(5-t-butyl-1,3,4-thiadiazol-2-yl)-1,3-dimethylurea

A reaction mixture was prepared containing 9 g. of 18 M sulfuric acid and 40 ml. of xylene in a 250 ml. 3-neck round-bottom flask. 9.5 g. of 1-pivalyl-4-methylthiosemicarbazide were added during which time the temperature rose to 45° C. Another 10 ml. of xylene were added and the temperature of the reaction raised to 55° C. where it was maintained for 1 hour. After cooling 25 ml. of water were added and the sulfuric acid neutralized with concentrated ammonium hydroxide as before. The sulfuric acid layer was separated and extracted twice with 25 ml. portions of xylene. The xylene washes were added to the xylene layer and the combined layers dried. 3.2 g. of methyl isocyanate were added. The reaction mixture was heated to a temperature in the range 85–90° C. and there maintained for 2.5 hours. Cooling yielded a precipitate of 1 - (5 - t-butyl-1,3,4-thiadiazol-2-yl)-1,3-dimethylurea formed in the above reaction which was isolated by the procedure of Example 2 to give 9.3 g. (82% yield) of material melting in the range 160–162° C.

EXAMPLE 4

Preparation of 1-(5-t-butyl-1,3,4-thiadiazol-2-yl)-1,3-dimethylurea 67 liters of 18 M sulfuric acid were placed in a 200 gallon glass lined still. To this still were added 137 kg. of 1 - pivalyl-4-methylthiosemicarbazide while maintaining the temperature in the range 50–55° C. After the addition had been completed, the reaction mixture was stirred for an additional hour in the same temperature range. 100 l. of cold water were added followed by 200 l. of 28% ammonium hydroxide which was added over about a 2 hour period. The pH of the resulting solution was 7.2. Next 300 l. of toluene were added and the reaction mixture was stirred for about 40 min. The aqueous layer was separated and the toluene layer washed with three 100 l. portions of distilled water. The reaction mixture was dried by azeotropic distillation. Next 45 kg. of methylisocyanate was added to the toluene solution over a 1 hour period while the temperature was kept in the range 44–70° C. After the addition had been completed, the reaction mixture was heated in the range 80–85° C. for about 2 hours and then cooled. A mixture of 19 l. of distilled water and 19 l. of 28% ammonia were added to destroy any excess isocyanate. The reaction mixture was then cooled to about 0° C. at which point 1-(5-t-butyl-1,3,4-thiadiazol-2-yl)-1,3-dimethylurea formed in the above reaction precipitated. The compound was separated by filtration and the filter cake washed with 80 l. of cold toluene followed by 190 l. of distilled water at 5° C. The filter cake was dried at 70° C. for 3 days. The weight of the filter cake was 139.5 kg.

In carrying out the process of this invention, it is preferred to use toluene or xylene because their slightly higher boiling point makes possible a higher reaction temperature for the isocyanate reaction. The use of benzene, however, is included within the scope of the process of this invention since it is equally operative.

In the above examples, the aromatic hydrocarbon solvent has been added during or at the end of the ring-closure reaction. It is within the scope of this invention, however, to have the aromatic hydrocarbon present ab initio.

The principal advantage of the process of this invention lies in the simplicity of operation in that the entire synthetic procedure can be carried out in a single vessel. In the presence of the aromatic hydrocarbon solvent, the ring-closure step which proceeds in the acidic layer is facilitated because the product of the reaction passes into the aromatic hydrocarbon solvent layer. Secondly, the heavier sulfuric acid layer is readily withdrawn from the reaction vessel at the end of the ring-closure step and the remaining organic layer can be azeotropically dried by simple distillation of a small fraction of the aromatic hydrocarbon solvent present. Finally, the isocyanate reaction to form the urea is easily carried out in the presence of an aromatic hydrocarbon solvent. The fact that the operations can be carried on in a single vessel and that it is not necessary to isolate the intermediate 1,3,4-thiodiazole both tend to simplify and make less expensive the preparation of the final urea. In addition, there is no adverse effect upon yield from carrying out the reaction as provided by this invention without isolation of the intermediate products and in fact the yields are somewhat higher, nor is the purity of the final product adversely affected. Finally, the presence of an aromatic hydrocarbon solvent during the ring-closure reaction allows the use of a mineral acid with a consequent saving both in initial cost and in cost of disposing of the acid waste.

I claim:

1. A process for the preparation of 1-(5-alkyl-1,3,4-thiadiazol-2-yl)-1,2-dialkyl ureas which comprises adding a compound of the formula

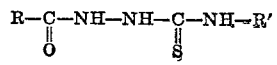

wherein R is $C_1$-$C_6$ alkyl, or halo-$C_1$-$C_3$ alkyl, R' is $C_1$-$C_6$ alkyl or hydrogen; to a mineral acid, heating the resulting mixture in the presence of an aromatic hydrocarbon solvent at 60° C. or less until a substantial quantity of a compound of the formula

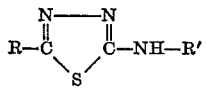

wherein R nd R' have the same meaning as hereinabove, is formed, separating the acidic layer, leaving the organic layer in the reaction vessel, drying the organic layer azeotropically, adding an isocyanate of the formula

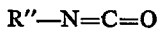

wherein R" is $C_1$-$C_4$ alkyl; then heating the resulting mixture to form a thiadiazole of the formula

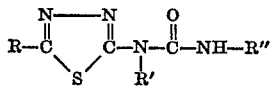

wherein R, R' and R" have the same meaning as hereinabove and then isolating said thiadiazole.

2. A process according to claim 1 in which R and R' are $C_1$-$C_6$ alkyl and R" is $C_1$-$C_4$ alkyl.

References Cited

FOREIGN PATENTS 1,816,696  8/1969  Germany _____ 260—306.8

OTHER REFERENCES

Hoggarth, J. Chem. Soc., 1163 (1949).
Ohta et al., J. Pharm. Soc., Japan, 72, 376 (1952).

RICHARD J. GALLAHER, Primary Examiner

U.S. Cl. X.R.

71—90

PO-1050
(5/69)

UNITED STATES PATENT OFFICE
CERTIFICATE OF CORRECTION

Patent No. 3,803,164      Dated April 9, 1974

Inventor(s) Eddie V. P. Tao

It is certified that error appears in the above-identified patent and that said Letters Patent are hereby corrected as shown below:

Column 1, line 36, "polyphosphoic" should read --polyphosphoric--.

Column 2, line 6, insert the word "such" at the end of the line, after "mineral acids."

Column 4, line 58, "1,3,4-thiodiazole" should read --1,3,4-thiadiazole--.

Column 4, line 71, "-1,2-dialkyl" should read -- -1,3-dialkyl--.

Signed and sealed this 21st day of January 1975.

(SEAL)
Attest:

McCOY M. GIBSON JR.
Attesting Officer

C. MARSHALL DANN
Commissioner of Patents